United States Patent [19]
Hare et al.

[11] 3,765,119
[45] Oct. 16, 1973

[54] SNARE DEVICE

[75] Inventors: Alan W. Hare; Ronald J. Carlson, both of Port Angeles, Wash.

[73] Assignee: Northwest Technical Industries, Inc., Port Angeles, Wash.

[22] Filed: Dec. 6, 1972

[21] Appl. No.: 312,774

[52] U.S. Cl. .................................. 43/87, 294/19 R
[51] Int. Cl. ............................................. A01m 23/24
[58] Field of Search ....................... 43/87; 119/153; 294/19 R

[56] References Cited
UNITED STATES PATENTS
2,179,394  11/1939  Wulff ..................................... 43/87
3,540,769  11/1970  Rosser .............................. 294/19 R FOREIGN PATENTS OR APPLICATIONS
898,384  6/1962  Great Britain ......................... 43/87

Primary Examiner—Russell R. Kinsey
Assistant Examiner—J. A. Oliff
Attorney—Ford W. Smith

[57] ABSTRACT

The snare comprises an elongated two-part stiff shank or stem member to be manually grasped single-handedly at the proximate end and having a flexible extension portion at the distal end. A traveller member carrying latch means slides along the stiff portion between the distal end and the handle portion. At the extreme or outer end of the flexible portion is a snaring strand having a ring-like member adapted to encircle and slidably move along both the flexible and rigid portions of the snare. The ring-like member may engage and be retained by the latch means on the traveller member. When the flexible snaring strand is tensed as when the ring-like member is drawn toward the proximate end of the shank or stem portion, the flexible portion of the shank is bowed and energy is stored to be employed when a snaring operation is to be performed. When the ring like member is released a snaring loop is formed and cast outward and around an object such as a fish or snake or animal about which the snare is placed.

6 Claims, 6 Drawing Figures

PATENTED OCT 16 1973 3,765,119
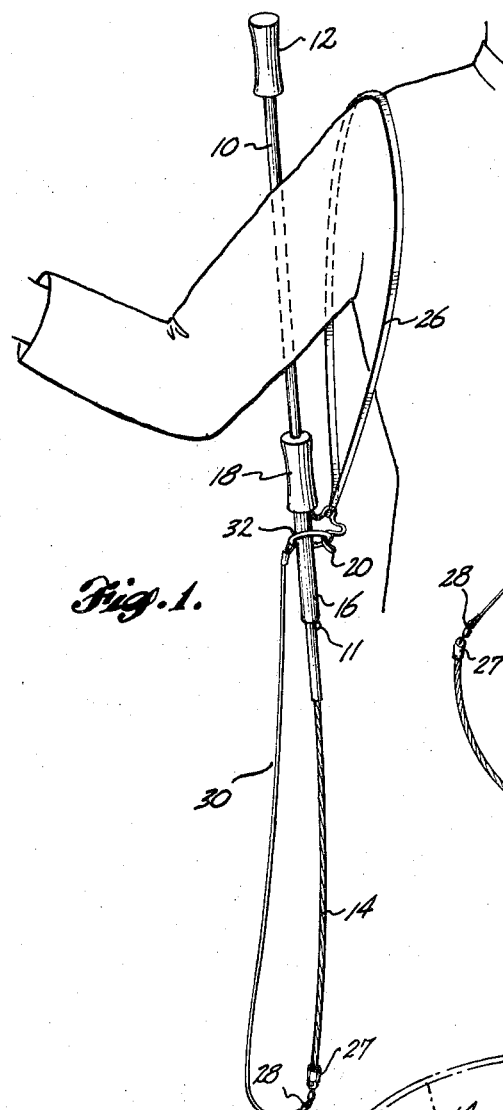
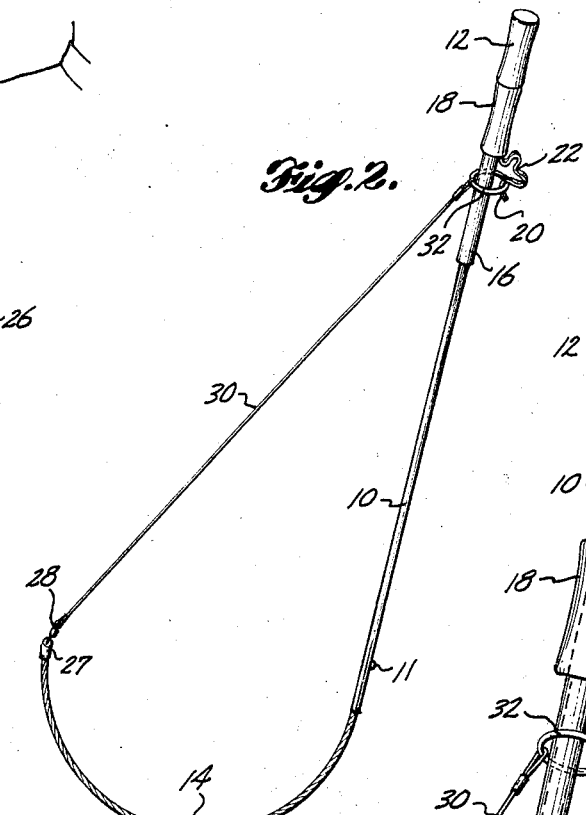
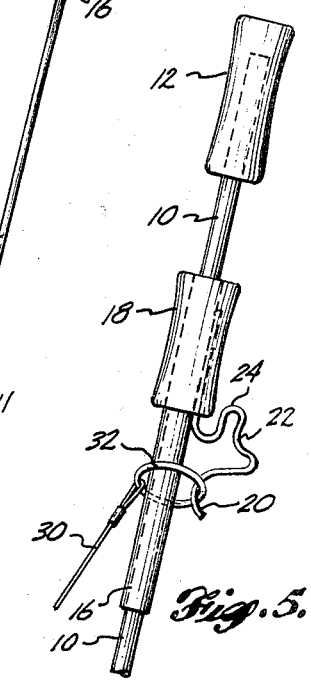
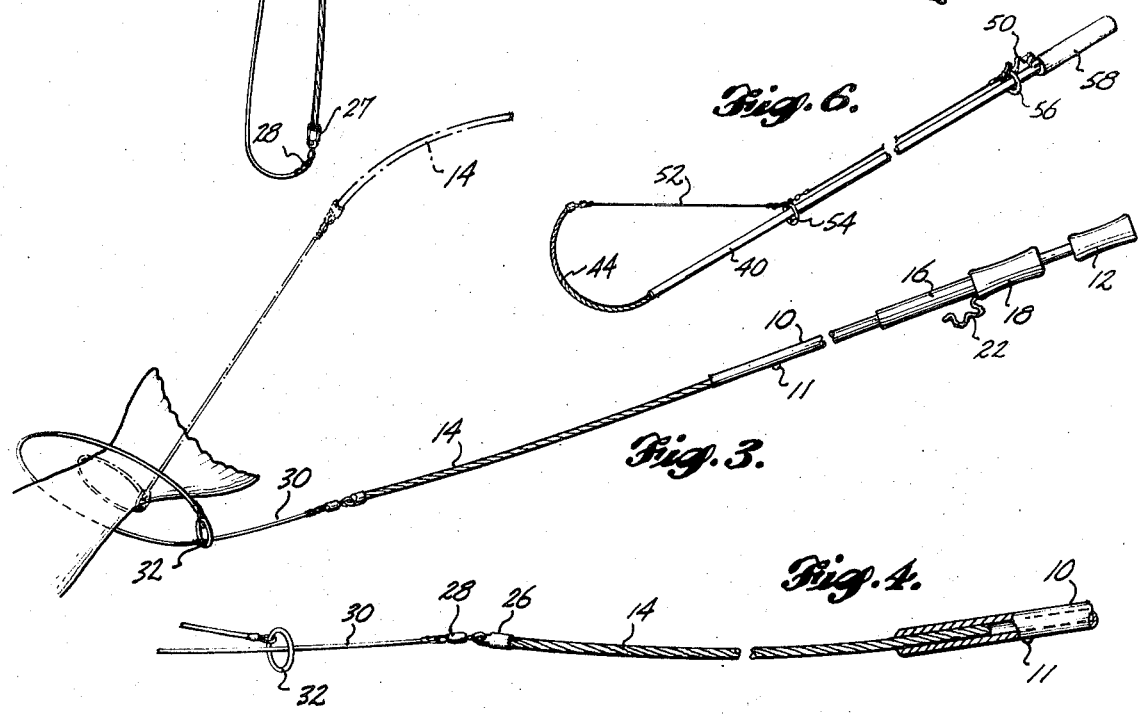

SNARE DEVICE

BACKGROUND OF THE INVENTION

1. Field of the Invention

This invention pertains to snares, and particularly to single hand-operated, spring-powered snares suitable for tailing fish or snaring snakes and animals by encircling the same with a loop cast by stored power and tightened by manipulation of the snare structure.

2. Description of the Prior Art

It is common paractice to capture fish by means of nets, gaffs, mechanical grabs and manually or spring-operated snares. A particular problem arises for example in connection with landing or finally capturing a steelhead salmon or other sports fish because, with most of the known prior devices, the operation requires the use of both the fisherman's hands. A person fishing in either a stream and deep water using a conventional fishing rod or the like must ordinarily hold hid rod in one hand, while he completes the landing operation with the other. A net is useful but usually is bulky and clumsy and difficult to handle. A gaff is less bulky and clumsy but can present a dangerous situation to the fisherman both in carrying the gaff and in using it. Also a gaff mutilates a fish. Whenever it is desirable to release a hooked and almost landed fish relatively unharmed, the gaff is so damaging that its use is practically precluded. The operation to which this invention is directed is known as "tailing" the fish. One mode of tailing a fish is disclosed in the 1970 U.S. Pat. No. 3,540,769 issued to Gerald E. Rosser, wherein is shown a spring drawn snare loop that, while fully expanded, is placed about the fish from its tail end and then closed to tightly grip the fish in such a manner that it cannot easily escape.

A particular known fish tailer is the one disclosed in U.S. Pat. No. 2,179,394 issued Nov. 7,1939, to Lee Wulff. This tailer comprises a rigid handle having a flat spring extension slidably mounted in and extendable from the distal end of the handle. Two hands are required to extend the parts. A flexible cable attached to the outer end of the flat spring is provided with a ring or loop which engages about the spring and handle to hold the spring in bowed position to form a snare loop. The tailer disclosed in the Wulff patent shows fixed latch means. The function of which is not otherwise disclosed and can only be assumed to relate to the ring. A disadvantage of this type of tailer is the requirement that both hands of the operator must be used to thread and tense the loop. Thus, a fisherman must carry the device in "cocked" condition, or he or a companion must tense the device just prior to use. A further disadvantage is that the handle and the bow spring in Wulff's preferred form are slidably connected together so that inward telescoping of the spring extension while the device is carried cocked is possible.

SUMMARY OF INVENTION

This invention pertains to a snare, powered by a bow-spring, which may be cocked or tensed by a fisherman or other operator using but a single hand when it is desired to perform a snaring operation. At other times, the snare may be carried conveniently and without difficulty by the fisherman, ready for use but without the parts being tensed and powered until just prior to the moment that use is to be made of the apparatus. The snare instrument is elongated so that the user may perform the snaring operation at a substantial distance from himself. It lends itself well to construction from light-weight materials, is simple in form and extremely easy to use and to manipulate during the placement of the snaring loop about a fish or snake or animal to be snared, and is practically certain to effectively capture and immobilize the object being snared.

In the preferred form of the invention illustrated the apparatus is primarily designed for use in the area proximate to the feet of the operator. In a modified form of the snare, certain elongation of the construction is illustrated permitting the same to be used as in situations over the side of a high freeboard vessel or boat in deep water or at longer distance from the operator where for safety reasons or convenience such is desirable.

BRIEF DESCRIPTION OF THE DRAWINGS:

FIG. 1 is a sketch illustrating the snare device of this invention and showing the manner in which a user may easily carry it tensed and conveniently located for immediate use;

FIG. 2 shows the snare device in tensed or powered arrangement;

FIG. 3 is a sketch illustrating the manner in which the snaring operation is performed;

FIG. 4 is an enlarged detailed view of the flexible bow-spring element employed in the snare;

FIG. 5 is an enlarged detail of the handle of the proximate end of the snare and of an element movable relative thereto to retain the snaring strand in cocked condition; and FIG. 6 shows an alternative elongated form of the snare.

DESCRIPTION OF THE PREFERRED EMBODIMENT

In FIG. 2 is shown the snare device which essentially comprises rigid stem 10 having a handle 12 at its proximate end and a bow-spring element 14 fixed to and extending from its distal end. The butt of the bow spring 14, as shown in FIG. 4, is inserted telescopically into the outer or distal end of member 10. Stem 10 is preferably an elongated tube preferably of aluminum or the like in order that the apparatus be light-weight, while at the same time applying substantial strength well-known to be inherent in tubular structures. Spring 14 may be fixed in the outer end of stem 10, or it may slidably telescope therein.

A second tubular member 16 having handle 18 is slidably mounted on stem 10 to travel in a telescopic fashion therealong between the distal end and handle 12. As shown in FIG. 5 there is a latching hook or tongue 20 extending forward alongside of traveller member 16. Tongue 20 is flexibly supported from handle 18 by the convoluted portion 22, which includes a portion 24 useful for the attachment of a resilient carrying loop 26 shown in FIG. 1. Loop 26 is desirably large enough to permit a fisherman or other user to carry the snare either around his shoulder and hanging at the rear of his hip in the manner depicted in FIG. 1, or loop 26 encircle the body over one shoulder and under the opposite arm.

The bow-spring 14 is preferably formed of a multistranded quite stiff but nevertheless flexible cable, roughly circular in cross-section. At its outer end spring 14 has a socket fitting 27 to which, by means of swivel 28, is attached the snaring strand 30. At the remote or outer end of strand 30 is attached ring 32. Ring 32 is freely movable not only along the standing part of strand 30 but also along bow spring 14, the rigid portion 10 and over the telescopic slidable portion 16, all as is shown in FIGS. 1, 2 and 3.

In the relaxed or un-cocked position the ring 32, engaged in the telescopic portion 16, is loosely held by latch member 20 (See FIG. 1). In this arrangement traveller member 16 is located close to the distal end of stem 10 against protruding stop 11. The snaring strand 30 is not under tension and therefore is shown as hanging loose and untensed ready for use. The bow spring 14 is shown slightly curved but nevertheless relaxed. It has been found that with a multistranded cable that has been used several times tends to take a "set" and become bowed somewhat as shown in both FIGS. 1 and 4. Naturally if element 14 were not bowed but straight in extension of the member 10, the strand 30 would not have the looped condition shown in FIG. 1. It would nevertheless be untensed.

When a person desires to use the snare device he merely reaches behind himself and grasps handle 18 stretching resilient loop 30 as he begins to draw the handle 18 along member 10 into close proximity to handle member 12. This he can easily accomplish by seating the butt handle 12 against his hip or body while using his thumb to hold ring 30 adjacent the handle portion 18. As he draws the traveller member 16 inward or toward the proximate end of the stem 10 the strand is caused to be tensed and the spring member 14 to be bowed in the manner shown in FIG. 2. Considering that the user is a fisherman, he will naturally manipulate his rod and line and the hooked fish into the neighborhood of his feet. Simultaneously holding the snare cocked as in FIG. 2 he can then easily slip the same over the tail of the fish.

Thereafter the operation is somwhat as illustrated in FIG. 3. The ring 30 is released to slide freely outward on members 16 and 10 and along the length of the bow spring 14 until it arrives at the standing part of the snare strand 30 whereupon the loop is formed. The force of the bow spring 14 tends to "throw" the loop as illustrated in FIG. 3, much as a person with a lasso throws the loop, outward and away from himself. As the loop is closing or reducing in size it is desirable that the operator also raise the tip of the snare device, particularly the bow spring end 14, as shown in dotted lines in FIG. 3. This results in tightening the loop in such a manner as to practically preclude any escape of the snared object therefrom. In the case of a fisherman, having once securely "tailed" his fish, he then is free to lay down his rod. Using the thus freed hand he may either bash the fish on the head or otherwise secure it. Of course, if he intends to release the fish, he need only disengage the hook, loosen the snaring loop and reintroduce the fish to the water.

In FIG. 6 is shown an elongated snare comprising the elongated shank or stem 40, having butt handle 42 and bow spring 44 which telescopes into stem 40. The slidably mounted traveller handle 59 carries latch means 50. Strand 52 connects with ring 54. A secondary strand also connected with ring 54 extends to and ends at ring 56. Ring 56 may be held by latch 50 as previously described. The elongated snare of FIG. 6 is particularly useful over the side of a boat or where snaring is desirably conducted at a greater distance than with snares as in FIGS. 1 and 2. When ring 56 is released the force stored in spring 44 rapidly draws the strand 52 and rings 54, 56 outward on stem 40, throwing the described loop in strand 52, which loop may be firmly tightened by lifting the outer end of shank or stem 40.

The release of ring 32 when it is desired to throw a snaring loop may be accomplished in two ways. With ring 32 engaged on latch tongue 20 one need only press on the convoluted portion 22 tending to force tongue 20 closer to traveller 16 whereupon the pull on strand 30 disengages the ring 32 and the loop-throwing action is initiated. Alternatively it has been found that a person may hook his forefinger outward of ring 32 alongside of tube 16 and inside snare strand 30. He then disengages ring 32 from tongue 20 and employs only his forefinger as a sort of latch or trigger. Immediately upon withdrawal of the forefinger from engagement with strand 30 the ring 32 moves outward and the action is as described.

The utility of having the latch mean 20, 22 movably mounted for various positions along the length of shank or stem 10 is emphasized in order to be appreciated. It is considered to be the main factor in this assembly contributing to the provision of a snare which may be carried un-cocked or untensed and yet which may by the use of a single-hand be cocked or tensed and used when needed with facility, quickly and surely.

It is to be understood that the snare described and shown herein is the preferred embodiment of the invention. It is nevertheless capable of variations and modifications without departing from the spirit and scope of the invention. As an example, the preferred snare strand 30 is a light weight, strong and flexible multistranded cable. However, the strand may be satisfactory provided by using a nylon monofilament or a woven multi-stranded length of linen or plastic or glass fibers. The shank in stem 10 may be circular in cross-section or, alternatively square or other rod-like shape. Other variations will occur readily to normally skilled mechanics. Thus the scope of this invention is not to be limited to precise details as illustrated or described but by an appropriately liberal application of the doctrine of equivalents in the interpretation of the following claims:

What is claimed is:

1. A snaring device having an elongated shank or stem having a bowable extension on the distal end and a snare strand extending from the outer end of said extension including a ring for disposition and free sliding over the length of said extension and along said shank or stem toward and away from the proximate end thereof, the improvement, comprising a traveller slidably mounted on said shank or stem for movement between a location near the distal end of said shank or stem and the proximate end thereof;

said traveller carrying pressure release latch means for retaining said ring and for maintaining the snare strand disposed alongside said extension and shank or stem when said ring is disposed about said traveller and engaged with said latch means.

2. The snaring device according to claim 1 in which the traveller is a sleeve surrounding said shank.

3. The snaring device according to claim 2 in which the shank carries stop means near its outer end operable to limit outward travel of said traveller.

4. The snaring device according to claim 1 in which there in a carrying loop whereby to encircle a portion of the user's body, and said carrying loop is attached to said pressure release latch means.

5. The snaring device according to claim 1 in which the pressure release latch means for retaining said ring comprises tongue forwardly extending alongside said traveller.

6. The snaring device according to claim 1 in which the bowable extension is a multi-stranded flexible cable mounted at the distal end of said shank or stem.

* * * * *